(12) United States Patent
Sawaki et al.

(10) Patent No.: US 7,722,717 B2
(45) Date of Patent: May 25, 2010

(54) HYDRAULIC COMPOSITION

(75) Inventors: Daisuke Sawaki, Sakura (JP); Susumu Sano, Sakura (JP); Kenichi Homma, Sakura (JP); Kouki Ichitsubo, Sakura (JP); Kenichi Matsumoto, Sakura (JP); Makihiko Ichikawa, Sakura (JP)

(73) Assignee: Taiheiyo Cement Corporation, Tokyo (JP)

( * ) Notice: Subject to any disclaimer, the term of this patent is extended or adjusted under 35 U.S.C. 154(b) by 828 days.

(21) Appl. No.: 10/591,697

(22) PCT Filed: Sep. 30, 2004

(86) PCT No.: PCT/JP2004/014328

§ 371 (c)(1), (2), (4) Date: Sep. 5, 2006

(87) PCT Pub. No.: WO2005/087681

PCT Pub. Date: Sep. 22, 2005

(65) Prior Publication Data

US 2007/0193477 A1  Aug. 23, 2007

(30) Foreign Application Priority Data

Mar. 11, 2004  (JP) ............................. 2004-068428

(51) Int. Cl.
*C04B 7/21* (2006.01)
*C04B 7/24* (2006.01)
(52) U.S. Cl. ................. 106/715; 106/745; 106/772
(58) Field of Classification Search ................. 106/745, 106/715, 772
See application file for complete search history.

(56) References Cited

U.S. PATENT DOCUMENTS

| 1,722,480 | A  | * | 7/1929  | Pontoppidan ............... 106/757 |
| 4,022,630 | A  | * | 5/1977  | Watson et al. ............... 106/745 |
| 4,081,285 | A  | * | 3/1978  | Pennell ....................... 106/740 |
| 6,764,544 | B2 | * | 7/2004  | Oates et al. ................. 106/763 |
| 2008/0276676 | A1 | * | 11/2008 | Sawaki et al. .................. 71/25 |

FOREIGN PATENT DOCUMENTS

| JP | 52154833   | * | 12/1977 |
| JP | 357198752  | * | 12/1982 |
| JP | 08 012387  |   | 1/1996  |
| JP | 11 302045  |   | 11/1999 |
| JP | 2000 281399|   | 10/2000 |
| JP | 2000 344555|   | 12/2000 |
| JP | 2001 064047|   | 3/2001  |
| JP | 2002 187747|   | 7/2002  |
| JP | 2002 234757|   | 8/2002  |
| JP | 2002 265242|   | 9/2002  |
| JP | 2004 002155|   | 1/2004  |

OTHER PUBLICATIONS

JP 357198752 A (Dec. 6, 1982) Hirano et al. abstract only.*
JP 52154833 A (Dec. 22, 1977) Chchibu Cement KK . . . abstract only.*

* cited by examiner

*Primary Examiner*—Paul Marcantoni
(74) *Attorney, Agent, or Firm*—Oblon, Spivak, McClelland, Maier & Neustadt, L.L.P.

(57) ABSTRACT

A hydraulic composition including: a ground burned product A having a hydraulic modulus (H.M.) of 1.8 to 2.3, a silica modulus (S.M.) of 1.3 to 2.3 and an iron modulus (I.M.) of 1.3 to 2.8; and a gypsum. The hydraulic composition is capable of reducing heat of hydration and producing a mortar or a concrete excellent in flowability and strength development.

8 Claims, No Drawings

HYDRAULIC COMPOSITION

TECHNICAL FIELD

The present invention relates to a hydraulic composition capable of reducing heat of hydration and producing mortars and concretes excellent in flowability and strength.

BACKGROUND ART

In Japan, the total volume of industrial wastes and non-industrial wastes is rapidly increasing because of the economic growth, and because of the massive movement of population into urban areas. In most cases, such wastes have traditionally been reduced to one tenth in volume by incineration and then discarded by landfill. In recent years, however, there has been urgent need for the development of a method for treating waste as the capacity of landfill sites becomes extremely tight.

In order to solve such problems, the cement industry is reusing most of the industrial wastes and non-industrial wastes as cement raw materials (e.g. Patent Document 1, etc.).

However, the waste, when hugely used as a cement raw material, poses the problem that the amount of $3CaO.Al_2O_3$ increases and thereby heightens the hydration heat of cement. Furthermore, the mortar and concrete produced using such a cement and an admixture have the problem that a mortal flow or slump decreases and a flow loss or slump loss increases.

[Patent Document 1] Japanese Patent Laid-Open No. 56-120552

DISCLOSURE OF THE INVENTION

Problems to be Solved by the Invention

Thus, the object of the present invention is to provide a hydraulic composition capable of reducing heat of hydration and producing mortars and concretes excellent in flowability and strength development.

Means for Solving the Problems

In view of such circumstances, the present inventors have conducted vigorous studies, and resultantly found that a hydraulic composition having reduced heat of hydration and an excellent flowability is obtained by using a ground product of a burned product having a specific hydraulic modulus, silica modulus and iron modulus and a gypsum in combination, leading to completion of the present invention.

That is, the present invention provides a hydraulic composition containing a ground product of a burned product A having a hydraulic modulus (H.M.) of 1.8 to 2.3, a silica modulus (S.M.) of 1.3 to 2.3 and an iron modulus (I.M.) of 1.3 to 2.8 and a gypsum.

Advantages of the Invention

The hydraulic composition of the present invention is capable of reducing heat of hydration and producing mortars and concretes excellent in flowability and strength development.

The hydraulic composition of the present invention promotes the effective use of wastes, in that industrial wastes, non-industrial wastes, soil generated by construction, and the like can be used as raw materials.

BEST MODE FOR CARRYING OUT THE INVENTION

A burned product A for use in the present invention has a hydraulic modulus (H.M.) of 1.8 to 2.3, preferably 2 to 2.2. If the hydraulic modulus is less than 1.8, the contents of $3CaO.Al_2O_3$ ($C_3A$) and $4CaO.Al_2O_3.Fe_2O_3$ ($C_4AF$) in the burned product increase, the flowability of a mortal or a concrete tends to be degraded, and the burning of the burned product A is difficult. If the hydraulic modulus exceeds 2.3, the initial strength of the mortal or the concrete is improved, but long-term growth in strength is slow.

The burned product A has a silica modulus (S.M.) of 1.3 to 2.3, preferably 1.5 to 2. If the silica modulus is less than 1.3, the contents of $C_3A$ and $C_4AF$ in the burned product increase, the flowability of a mortar or a concrete tends to be degraded, and the burning of the burned product A is difficult. If the silica modulus exceeds 2.3, the contents of $C_3A$ and $C_4AF$ decrease, and the burning of the burned product A is difficult.

The burned product A has an iron modulus (I.M.) of 1.3 to 2.8, preferably 1.5 to 2.6. If the iron modulus is less than 1.3, the grinding characteristic of the burned product A is degraded, and if the iron modulus exceeds 2.8, the content of $C_3A$ in the burned product increases, and the flowability of a mortal or a concrete is degraded.

The hydraulic modulus (H.M.), the silica modulus (S.M.) and the iron modulus (I.M.) are expressed by the following formulae.

$$\text{Hydraulic modulus}(H.M) = \frac{CaO - 0.7 \times SO_3}{SiO_2 + Al_2O_3 + Fe_2O_3} \quad \text{[Formula 1]}$$

$$\text{Silica modulus}(S.M.) = \frac{SiO_2}{Al_2O_3 + Fe_2O_3}$$

$$\text{Iron modulus}(I.M.) = \frac{Al_2O_3}{Fe_2O_3}$$

Further, the burned product A preferably contains fluorine in an amount of 1% by mass or less, since heat of hydration of a hydraulic composition can be further reduced and the flowability of a mortar or a concrete can be further improved. If the content of fluorine exceeds 1% by mass, the setting is considerably delayed, which is not preferable. Particularly, the content of fluorine is preferably 0.5% by mass or less, further preferably 0.05 to 0.4% by mass from the viewpoint of the setting time.

The burned product A may be produced using a general Portland cement clinker raw material, namely a CaO raw material such as limestone, quicklime or slaked lime, an $SiO_2$ raw material such as silica stone or clay, an $Al_2O_3$ raw material such as clay, or an $Fe_2O_3$ raw material such as an iron scrap or an iron cake.

In the present invention, one or more types selected from industrial wastes, non-industrial wastes and soil generated by construction may be used as a raw material of the burned product A. Industrial wastes include fresh concrete sludge, various kinds of sludge (e.g. sewage sludge, clean water sludge, construction sludge, ironwork sludge, etc.), construction scraps, concrete scraps, boring waste soil, various kinds of burned ashes, molding sands, rock wools, waste glasses, blast furnace secondary ashes and the like. Non-industrial wastes include sewage sludge dry powders, municipal refuse burned ashes, shells and the like, and the soil generated by construction includes soil originating from construction sites, engineering work sites and the like and surplus soil, and waste soil and the like.

As a fluorine raw material, fluorite ($CaF_2$) as well as sodium fluoride silicate produced from a phosphoric acid industrial furnace or a phosphoric acid fertilizer production furnace and a smoke thereof, and fluorine-containing wastes such as residues after treatment of waste water containing a fluorine-based cleaning agent used in a semiconductor or electrical and electronic industry may be used.

By mixing these raw materials so as to obtain a predetermined hydraulic modulus, silica modulus and iron modulus, and burning the resultant mixture preferably at 1200 to 1550° C., more preferably at 1350 to 1450° C., the burned product A can be produced.

The method for mixing the raw materials is not specifically limited, and an ordinary apparatus or the like may be used to mix the raw materials. The apparatus for use in burning is not specifically limited, and for example, a rotary kiln or the like may be used. When the rotary kiln is used for burning, fuel substituting wastes, for example waste oils, waste tires, waste plastics and the like may be used.

For the burned product A, the amount of free lime is preferably 0.5 to 1% by mass from the viewpoint of improvement of the strength development, especially the initial strength development, of a mortal or a concrete and attainment of a good flowability and setting characteristic.

Gypsums for use in the present invention include dihydrate gypsums, α-type or β-type hemihydrate gypsums, anhydrous gypsums and the like, and may be used alone or in combination of two or more types thereof.

In the present invention, the ratio of the amount of $SO_3$ in the dihydrate gypsum and hemihydrate gypsum to the total amount of $SO_3$ in the hydraulic composition is preferably 40% by mass or more, especially preferably 50 to 95% by mass, further preferably 60 to 90% by mass from the viewpoint of reduction of heat of hydration, improvement of the flowability of a mortar or a concrete, compatibility with a water reducing agent, and so on.

The ratio of the amount of hemihydrate gypsum to the total amount of dihydrate gypsum and hemihydrate gypsum in the hydraulic composition is preferably 30% by mass or more, especially preferably 50% by mass or more, further preferably 60% by mass or more in terms of $SO_3$ from the viewpoint of reduction of heat of hydration, improvement of the flowability of a mortar or a concrete and the setting time.

Quantitative determination of a dihydrate gypsum or hemihydrate gypsum may be carried out by thermal analysis (thermogravimetry or the like) using a sample container described in Japanese Patent Laid-Open No. 6-242035. Quantitative determination of total $SO_3$ in the hydraulic composition may be carried out by chemical analysis.

In the hydraulic composition of the present invention, the amount of gypsum is preferably 1 to 6 parts by mass, especially preferably 2 to 4 parts by mass, in terms of $SO_3$ based on 100 parts by mass of a ground burned product A from the viewpoint of the flowability and strength development of a mortar or a concrete.

The hydraulic composition of the present invention can be produced by, for example, (1) a method of production by grinding the burned product A and a gypsum at the same time, or (2) a method of production by grinding the burned product A and mixing a gypsum with the ground burned product.

In the case of the method (1), the burned product A and the gypsum are ground to have a Blaine specific surface area of preferably 2500 to 4500 $cm^2/g$, especially preferably 3000 to 4500 $cm^2/g$.

In the case of the method (2), the burned product A is ground to have a Blaine specific surface area of preferably 2500 to 4500 $cm^2/g$, especially preferably 3000 to 4500 $cm^2/g$, and a gypsum having a Blaine specific surface area of preferably 2500 to 5000 $cm^2/g$, especially preferably 3000 to 4500 $cm^2/g$ is used.

The hydraulic composition of the present invention has a Blaine specific surface area of preferably 2500 to 4500 $cm^2/g$, especially preferably 3000 to 4500 $cm^2/g$ from the viewpoint of the flowability and strength development of a mortar or a concrete.

The hydraulic composition of the present invention may contain one or more inorganic powder selected from a blast furnace slag powder, a fly ash, a limestone powder, a silica stone powder and a silica fume. By containing these inorganic powders, the flowability and the strength development can be further improved.

The blast furnace slag powder, the fly ash, the limestone powder and the silica stone powder have a Blaine specific surface area of preferably 2500 to 10000 $cm^2/g$, especially preferably 3000 to 9000 $cm^2/g$ from the viewpoint of heat of hydration of the hydraulic composition and the flowability and strength development of a mortar or a concrete. The silica fume has a BET specific surface area of preferably 5 to 25 $m^2/g$, especially preferably 5 to 20 $m^2/g$ from the viewpoint of the flowability and strength development of a mortar or a concrete.

In the case of the blast furnace slag powder, the content of the inorganic powder in the hydraulic composition is preferably 10 to 150 parts by mass, especially preferably 20 to 100 parts by mass based on 100 parts by mass of a ground burned product A from the viewpoint of the flowability and strength development of a mortar or a concrete, the effect of inhibiting an alkali-aggregate reaction, and the sulfate resistance. The content of the fly ash, the limestone powder or the silica stone powder is preferably 10 to 100 parts by mass, especially preferably 20 to 80 parts by mass based on 100 parts by mass of a ground burned product A, and the content of the silica fume is preferably 1 to 50 parts by mass, especially preferably 5 to 30 parts by mass based on 100 parts by mass of a ground burned product A.

The hydraulic composition containing an inorganic powder is produced by, for example, (3) a method of production by mixing an inorganic powder with a hydraulic composition consisting of the burned product A and a gypsum, (4) a method of production by mixing a gypsum with a material obtained by grinding the burned product A and an inorganic powder at the same time, (5) a method of production by mixing a gypsum and an inorganic powder with the ground burned product A, or (6) a method of production by grinding the burned product A, a gypsum and an inorganic material at the same time.

The hydraulic composition containing an organic powder has a Blaine specific surface area of preferably 2500 to 5000 $cm^2/g$, especially preferably 3000 to 4500 $cm^2/g$ from the viewpoint of the flowability and strength development of a mortar or a concrete.

The hydraulic composition of the present invention may further contain a burned product B containing 10 to 2000 parts by mass of $2CaO.Al_2O_3.SiO_2$ ($C_2AS$) based on 100 parts by mass of $2CaO.SiO_2$ ($C_2S$) and having a content of $3CaO.Al_2O_3$ ($C_3A$) of 20 parts by mass or less. By containing the burned product B, heat of hydration of the hydraulic composition can be further reduced, and the flowability can be further improved.

The burned product B contains $C_2S$ and $C_2AS$, and $C_2AS$ is contained in an amount of 10 to 2000 parts by mass, preferably 10 to 200 parts by mass, especially preferably 10 to 100 parts by mass based on 100 parts by mass of $C_2S$. If the content of $C_2AS$ is less than 10 parts by mass, the flowability of a mortar or a concrete is degraded, and the amount of free lime is hard to decrease even through the burning temperature is elevated at the time of burning, and burning is difficult. The possibility that produced $C_2S$ is γ type $C_2S$ having no hydration activity is increased, and the strength development of a mortar or a concrete may be degraded. If the content of $C_2AS$ exceeds 2000 parts by mass, the strength development and durability of a mortar or a concrete may extremely be degraded.

The burned product B has a content of $C_3A$ of 20 parts by mass or less, preferably 10 parts by mass or less based on 100 parts by mass of $C_2S$. If the content of $C_3A$ exceeds 20 parts by mass, heat of hydration of the hydraulic composition increases, and the flowability of a mortar or a concrete is degraded.

The burned product B may be produced using a general Portland cement clinker raw material, namely a CaO raw material such as limestone, quicklime or slaked lime, an $SiO_2$ raw material such as silica stone or clay, an $Al_2O_3$ raw material such as clay, or an $Fe_2O_3$ raw material such as an iron scrap or an iron cake.

For the burned product B, one or more types selected from, for example, industrial wastes, non-industrial wastes and soil generated by construction may be used as a raw material. Industrial wastes include, for example, coal ashes; various kinds of sludge such as fresh concrete sludge, sewage sludge, clean water sludge, construction sludge and ironwork sludge; and boring waste soil, various kinds of burned ashes, molding sands, rock wools, waste glasses, blast furnace secondary ashes, construction scraps, concrete scraps and the like, and non-industrial wastes include sewage sludge dry powders, municipal refuse burned ashes, shells and the like. The soil generated by construction includes soil originating from construction sites, engineering work sites and the like and surplus soil, and waste soil and the like.

Depending on the raw material composition of the burned product B, $4CaO.Al_2O_3.Fe_2O_3$ ($C_4AF$) may be produced particularly when one or more types selected from the industrial wastes, non-industrial wastes and soil generated by construction are used as a raw material, but in the burned product B, a part of $C_2AS$, preferably 70% by mass or less of $C_2AS$ may be substituted by $C_4AF$. If $C_4AF$ is substituted in an amount exceeding this range, the temperature range of burning is narrowed, and control of production of the burned product B is difficult.

The mineral composition of the burned product B may be determined from the contents (% by mass) of CaO, $SiO_2$, $Al_2O_3$ and $Fe_2O_3$ in the materials used according to the following equations.

$C_4AF = 3.04 \times Fe_2O_3$ $C_3A = 1.61 \times CaO - 3.00 \times SiO_2 - 2.26 \times Fe_2O_3$ $C_2AS = -1.63 \times CaO + 3.04 \times SiO_2 + 2.69 \times Al_2O_3 + 0.57 \times Fe_2O_3$ $C_2S = 1.02 \times CaO + 0.95 \times SiO_2 - 1.69 \times Al_2O_3 - 0.36 \times Fe_2O_3$ By mixing the aforementioned raw materials so as to obtain a predetermined composition, and burning the resultant mixture preferably at 1000 to 1350° C., more preferably at 1150 to 1350° C., the burned product B can be produced.

The method for mixing the raw materials is not specifically limited, and an ordinary apparatus or the like may be used to mix the raw materials. The apparatus for use in burning is not specifically limited, and for example, a rotary kiln or the like may be used. When the rotary kiln is used for burning, fuel substituting wastes, for example waste oils, waste tires, waste plastics and the like may be used.

The ground burned product B is contained in an amount of preferably 10 to 100 parts by mass, especially preferably 20 to 60 parts by mass based on 100 parts by mass of a ground burned product A from the viewpoint of heat of hydration of the hydraulic composition, and the flowability, setting and strength development of a mortar or a concrete.

The hydraulic composition containing the ground burned product B can be produced by, for example, (7) a method of production by grinding the burned product A, the burned product B and a gypsum at the same time, (8) a method of production by grinding the burned product A and the burned product B at the same time and mixing a gypsum with the resultant ground product, (9) a method of production by grinding the burned product A and a gypsum at the same time and mixing the ground burned product B with the resultant ground product,

(10) a method of production by grinding the burned product B and a gypsum at the same time and mixing the ground burned product A with the resultant ground product,

(11) a method of production by grinding the burned product A and the burned product B separately and mixing the resultant ground product and a gypsum, or

(12) a method of production by mixing an inorganic powder with the product obtained by the methods (7) to (11).

In the case of the method (7), the burned product A, the burned product B and the gypsum are ground to have a Blaine specific surface area of preferably 2500 to 4500 cm²/g, especially preferably 3000 to 4500 cm²/g from the viewpoint of heat of hydration of the hydraulic composition and the flowability and the strength development of a mortar or a concrete.

In the case of the method (8), the burned product A and the burned product B are ground to have a Blaine specific surface area of preferably 2500 to 4500 cm²/g, especially preferably 3000 to 4500 cm²/g, and a gypsum having a Blaine specific surface area of preferably 2500 to 5000 cm²/g, especially preferably 3000 to 4500 cm²/g is used.

In the case of the method (9), the burned product A and the gypsum are ground to have a Blaine specific surface area of preferably 2500 to 4500 cm²/g, especially preferably 3000 to 4500 cm²/g, and a burned product B ground to have a Blaine specific surface area of preferably 2500 to 4500 cm²/g, especially preferably 3000 to 4500 cm²/g is used.

In the case of the method (10), the burned product B and the gypsum are ground to have a Blaine specific surface area of preferably 2500 to 4500 cm²/g, especially preferably 3000 to 4500 cm²/g, and a burned product A ground to have a Blaine specific surface area of preferably 2500 to 4500 cm²/g, especially preferably 3000 to 4500 cm²/g is used.

In the case of the method (11), the burned product A and the burned product B are each ground to have a Blaine specific surface area of preferably 2500 to 4500 cm²/g, especially preferably 3000 to 4500 cm²/g, and a gypsum having a Blaine specific surface area of preferably 2500 to 5000 cm²/g, especially preferably 3000 to 4500 cm²/g is used.

The hydraulic composition containing the ground burned product A, the ground burned product B and a gypsum has a Blaine specific surface area of preferably 2500 to 4500 cm²/g, especially preferably 3000 to 4500 cm²/g from the viewpoint of the flowability and strength development of a mortar or a concrete.

The hydraulic composition containing the ground burned product A, the ground burned product B, a gypsum and an inorganic powder has a Blaine specific surface area of preferably 2500 to 5000 $cm^2/g$, especially preferably 3000 to 4500 $cm^2/g$ from the viewpoint of the flowability and strength development of a mortar or a concrete.

The hydraulic composition of the present invention is used in the form of a paste, mortar or concrete. For the hydraulic composition, a lignin based, naphthalene sulfonic acid based, melamine based or polycarboxylic acid based water reducing agent (including an AE water reducing agent, a high range water reducing agent and an air entraining and high range water reducing agent) may be used.

When the hydraulic composition is used in the form of a mortar or concrete, a fine aggregate/coarse aggregate, for example a river sand, a land sand, a crushed sand or the like, or a river gravel, a mountain gravel, a crushed gravel or the like may be used. Molten slag produced by melting municipal refuges, municipal refuge burned ashes, sewage sludge burned ashes and the like, or wastes such as blast furnace slag, steelmaking slag, copper slag, glass scraps, glass cullet, ceramic scraps, clinker ashes, waste bricks and concrete scraps may be used for a part or all of the fine aggregate/coarse aggregate.

Further, an admixture such as an air entraining agent or an antifoaming agent may be used as necessary.

The method for mixing a paste, mortar or concrete is not specifically limited, and it may be mixed by, for example, a method in which materials are collectively put into a mixer and mixed for a minute or longer; a method in which materials other than water are put into a mixer and dry-mixed, water is then added, and the resultant mixture is mixed for a minute or longer; or the like. The mixer for use in mixing is not specifically limited, and an ordinary mixer such as a hovert mixer, a pan type mixer or a biaxial mixer may be used.

The method for forming a paste, mortar or concrete is not specifically limited, and for example, vibratory formation or the like may be performed. The curing condition is riot specifically limited, and for example, atmospheric curing, steam curing or the like may be performed.

Example 1

The present invention will now be described in detail with examples, but the present invention is not limited to the examples.

Examples 1-6

(1) Production of Burned Product A

Sewage sludge, soil generated by construction, fluorite and a general Portland cement clinker such as limestone were used as raw materials, and the raw materials were compounded so as to obtain a hydraulic modulus (H.M.), a silica modulus (S.M.) and an iron modulus (I.M.) shown in Table 1. The compounded raw material was burned at 1400 to 1450° C. by a small rotary kiln to obtain a burned product A. At this time, in addition to a general heavy oil, a waste oil and a waste plastic were used as a fuel. The chemical compositions of sewage sludge and soil generated by construction are shown in Table 2.

The amount of free lime in each burned product was 0.6 to 1% by mass.

TABLE 1

| | (Burned product A) | | | | |
|---|---|---|---|---|---|
| Burned product No. | Hydraulic modulus (H.M.) | Silica modulus (S.M.) | Iron modulus (I.M.) | Content of fluorine (% by mass) | Remarks |
| 1 | 2.16 | 1.92 | 1.72 | 0.1 | No wastes were used as a raw material |
| 2 | 2.17 | 1.93 | 1.68 | 0.1 | Sewage sludge was used as a part of raw material |
| 3 | 2.16 | 1.95 | 1.70 | 0.05 | Sewage sludge and soil generated by construction were used as a part of raw material |
| 4 | 2.18 | 1.95 | 1.71 | 0.3 | Sewage sludge, soil generated by construction and fluoride were used as a part of raw material |
| 5 | 2.17 | 1.94 | 1.70 | 0.8 | Sewage sludge, soil generated by construction and fluoride were used as a part of raw material |

TABLE 2

| | Ig.loss | $SiO_2$ | $Al_2O_3$ | $Fe_2O_3$ | CaO | $Na_2O$ | $P_2O_5$ | $SO_3$ | MgO | $K_2O$ |
|---|---|---|---|---|---|---|---|---|---|---|
| Sewage sludge | 15.0 | 30.0 | 16.1 | 8.0 | 10.9 | 4.2 | 10.7 | 0.4 | 0.01 | 0.02 |
| Soil generated by construction | 13.3 | 52.7 | 13.8 | 8.7 | 2.5 | 1.5 | 0.5 | 2.7 | 1.2 | 1.94 |

(2) Production of Hydraulic Composition

To 100 parts by mass of each burned product A of Table 1, a flue gas desulfurization dihydrate gypsum (manufactured by Sumitomo Metal Industries, Ltd.) and a hemihydrate gypsum obtained by heating the flue gas desulfurization dihydrate gypsum at 140° C. are mixed in amounts shown in Table 3, and ground at the same time by a batch type ball mill so that the Blaine specific surface area was 3250±50 cm$^2$/g, whereby a hydraulic composition was produced.

(3) Production of Mortar

A mortar was prepared using the aforementioned hydraulic composition, a fine aggregate (standard sand defined in JIS R 5201 (method of physical testing of cements)), a water reducing agent (polycarboxylic acid based air entraining and high range water reducing agent (Leobuild SP8N manufactured by NMB Co., Ltd.)) and water (tap water), and heat of hydration, setting, the flow value and the compressive strength were evaluated. The results are shown in Table 4. As Comparative Example 1, evaluations when using a commercially available Portland cement were made.

(3-1) Heat of Hydration;

Measurements were made in accordance with JIS R 5201 (method of physical testing of cement).

(3-2) Setting;

Measurements were made in accordance with JIS R 5201 (method of physical testing of cement).

(3-3) Flow Value

The mortar just after being mixed was put into a flow cone (diameter of the upper surface: 5 cm; diameter of the lower surface: 10 cm; and height: 15 cm), the expansion of the mortar when taking away the flow cone upward was measured, and a flow value was determined. The blended ratio in the mortar is as follows: water/hydraulic composition (mass ratio)=0.35, fine aggregate/hydraulic composition (mass ratio)=2.0, and water reducing agent/hydraulic composition (mass ratio)=0.0065.

(3-4) Compressive Strength

The compressive strength of the mortar after 3 days, 7 days and 28 days was measured in accordance with JIS R 5201 (method of physical testing of cement). The blended ratio in the mortar is as follows: water/hydraulic composition (mass ratio)=0.5 and fine aggregate/hydraulic composition (mass ratio)=3.0.

TABLE 3

|  |  | Burned product No. | Amount of gypsum added* (parts by mass) | | [Hemihydrate] / ([Dihydrate]+[Hemihydrate]) | [Dihydrate]+[Hemihydrate] Total amount of SO$_3$ in hydraulic composition |
|---|---|---|---|---|---|---|
|  |  |  | Dihydrate gypsum | Hemihydrate gypsum |  |  |
| Examples | 1 | 1 | 0.5 | 2.0 | 80% by mass | 85.0% by mass |
|  | 2 | 2 | 0.5 | 2.0 | 80% by mass | 86.5% by mass |
|  | 3 | 3 | 0.5 | 2.0 | 80% by mass | 85.6% by mass |
|  | 4 | 4 | 0.5 | 2.0 | 80% by mass | 83.6% by mass |
|  | 5 | 5 | 0.5 | 2.0 | 80% by mass | 85.9% by mass |
|  | 6 | 4 | 1.25 | 1.25 | 50% by mass | 83.6% by mass |

*in terms of SO$_3$

In the table, [dihydrate] refers to SO$_3$ in dihydrate gypsum, and [hemihydrate] refers to SO$_3$ in hemihydrate gypsum.

The total amount of SO$_3$ in the hydraulic composition was quantitatively determined by chemical analysis.

TABLE 4

|  |  | Heat of hydration (J/g) | | Setting (min) | | Flow value (mm) | Compressive strength (N/mm$^2$) | | |
|---|---|---|---|---|---|---|---|---|---|
|  |  | After 7 days | After 28 days | Start | Concentration |  | After 3 days | After 7 days | After 28 days |
| Examples | 1 | 345 | 394 | 110 | 185 | 318 | 35.4 | 47.9 | 60.7 |
|  | 2 | 347 | 397 | 115 | 190 | 312 | 35.1 | 48.5 | 61.0 |
|  | 3 | 350 | 398 | 105 | 170 | 243 | 34.3 | 48.2 | 60.3 |
|  | 4 | 307 | 361 | 155 | 230 | 337 | 36.2 | 48.9 | 60.8 |
|  | 5 | 290 | 343 | 205 | 280 | 348 | 37.0 | 49.2 | 61.0 |
|  | 6 | 340 | 397 | 160 | 235 | 271 | 35.8 | 48.5 | 60.5 |
| Comparative Example 1 |  | 332 | 385 | 125 | 200 | 254 | 30.6 | 41.3 | 59.4 |

From the results of Table 4, the mortar using the hydraulic composition of the present invention had reduced heat of hydration and a good flowability. In addition, it was excellent in strength development.

Examples 7-14

(1) Production of Burned Product A

Sewage sludge, soil generated by construction and a general Portland cement clinker such as limestone were used as raw materials, and the raw materials were compounded so as to obtain a hydraulic modulus (H.M.), a silica modulus (S.M.) and an iron modulus (I.M.) shown in Table 5. The compounded raw material was burned at 1400 to 1450° C. by a small rotary kiln to obtain a burned product A. At this time, in addition to a general heavy oil, a waste oil and a waste plastic were used as a fuel. The chemical compositions of sewage sludge and soil generated by construction are shown in Table 2.

The amount of free lime in each burned product was 0.6 to 1% by mass.

TABLE 5

(Burned product A)

| Burned product No. | Hydraulic modulus (H.M.) | Silica modulus (S.M.) | Iron modulus (I.M.) | Remarks |
|---|---|---|---|---|
| 6 | 2.16 | 1.65 | 1.99 | No wastes were used as a raw material |
| 7 | 2.10 | 1.65 | 1.99 | Sewage sludge was used as a part of raw material |
| 8 | 2.12 | 1.95 | 1.89 | Sewage sludge and soil generated by construction were used as a part of raw material |

(2) Production of Hydraulic Composition

To 100 parts by mass of each burned product A of Table 5, a hemihydrate gypsum obtained by heating a flue gas desulfurization dihydrate gypsum (manufactured by Sumitomo Metal Industries, Ltd.) at 140° C. was added in an amount of 3.0 parts by mass in terms of $SO_3$, and the resultant mixture was ground at the same time by a batch type ball mill so that the Blaine specific surface area was 3250±50 $cm^2/g$, whereby a ground product was prepared. To the product, a blast furnace slag (Blaine specific surface area: 4000$cm^2/g$) and a limestone powder (Blaine specific surface area: 4230 $cm^2/g$) were mixed in a ratio shown in Table 6 to obtain a hydraulic composition.

(3) Production of Mortar

A mortar was prepared using the aforementioned hydraulic composition, a fine aggregate (standard sand defined in JIS R 5201 (method of physical testing of cements)), a water reducing agent (polycarboxylic acid based air entraining and high range water reducing agent (Leobuild SP8N manufactured by NMB Co., Ltd.)) and water (tap water), and the flow value and the compressive strength were evaluated in the same manner as in Examples 1 to 6. The results are also shown in Table 6. As Comparative Example 2, evaluations when using a commercially available Blast furnace cement B type were made.

TABLE 6

| | | Burned product No. | Hydraulic composition | Flow value (mm) | Compressive strength ($N/mm^2$) | | |
|---|---|---|---|---|---|---|---|
| | | | | | After 3 days | After 7 days | After 28 days |
| Examples | 7 | 6 | 70 parts by mass of ground product 30 parts by mass of blast furnace slag powder | 318 | 27.6 | 38.2 | 58.9 |
| | 8 | 6 | 60 parts by mass of ground product 40 parts by mass of blast furnace slag powder | 313 | 24.8 | 37.1 | 59.1 |
| | 9 | 7 | 70 parts by mass of ground product 30 parts by mass of blast furnace slag powder | 316 | 27.2 | 38.0 | 58.6 |
| | 10 | 7 | 60 parts by mass of ground product 40 parts by mass of blast furnace slag powder | 312 | 24.3 | 36.9 | 59.2 |
| | 11 | 8 | 70 parts by mass of ground product 30 parts by mass of blast furnace slag powder | 315 | 24.3 | 34.5 | 57.9 |
| | 12 | 8 | 60 parts by mass of ground product 40 parts by mass of blast furnace slag powder | 310 | 23.5 | 33.2 | 57.6 |
| | 13 | 7 | 55 parts by mass of ground product 40 parts by mass of blast furnace slag powder | 320 | 27.5 | 39.5 | 58.2 |

TABLE 6-continued

| Burned | | | Compressive strength (N/mm²) | | |
|---|---|---|---|---|---|
| product No. | Hydraulic composition | Flow value (mm) | After 3 days | After 7 days | After 28 days |
| 14 | 8 | 5 parts by mass of limestone powder 55 parts by mass of ground product 40 parts by mass of blast furnace slag powder 5 parts by mass of limestone powder | 317 | 26.7 | 38.7 | 58.0 |
| Comparative Example 2 | | Commercially available blast furnace cement B type | 310 | 20.6 | 34.0 | 58.6 |

From the results of Table 6, the mortal using the hydraulic composition of the present invention has a good flowability and strength development.

Examples 15-17

(1) Production of Hydraulic Composition

To 100 parts by mass of burned product No. 8 of Table 5, a flue gas desulfurization dihydrate gypsum (manufactured by Sumitomo Metal Industries, Ltd.) and a hemihydrate gypsum obtained by heating the flue gas desulfurization dihydrate gypsum at 140° C. are mixed in amounts shown in Table 7, and ground at the same time by a batch type ball mill so that the Blaine specific surface area was 3250±50 cm²/g, whereby a ground product was prepared. 55 parts by mass of each ground product, 45 parts by mass of blast furnace slag powder (Blaine specific surface area: 4000 cm²/g) and 5 parts by mass of limestone powder (Blaine specific surface area: 4230 cm²/g) were mixed to obtain a hydraulic composition.

(2) Production of Mortar

A mortar was prepared using the aforementioned hydraulic composition, a fine aggregate (standard sand defined in JIS R 5201 (method of physical testing of cements)), a water reducing agent (polycarboxylic acid based air entraining and high range water reducing agent (Leobuild SP8N manufactured by NMB Co., Ltd.)) and water (tap water), and heat of hydration, the flow value and the compressive strength were evaluated in the same manner as in Examples 1 to 6. The results are shown in Table 8. As Comparative Example 2, evaluations when using a commercially available Blast furnace cement B type were made.

TABLE 8

| | | Heat of hydration (J/g) | | Flow value (mm) | Compressive strength (N/mm²) | | |
|---|---|---|---|---|---|---|---|
| | | After 7 days | After 28 days | | After 3 days | After 7 days | After 28 days |
| Examples | 15 | 288 | 345 | 360 | 26.7 | 38.3 | 58.0 |
| | 16 | 297 | 351 | 345 | 26.8 | 38.5 | 57.5 |
| | 17 | 305 | 360 | 315 | 26.5 | 38.4 | 57.9 |
| Comparative Example 2 | | 307 | 358 | 310 | 20.6 | 34.0 | 58.6 |

TABLE 7

| | | Amount of gypsum added* (parts by mass) | | | |
|---|---|---|---|---|---|
| | | Dihydrate gypsum | Hemihydrate gypsum | $\dfrac{[\text{Hemihydrate}]}{[\text{Dihydrate}] + [\text{Hemihydrate}]}$ | $\dfrac{[\text{Dihydrate}] + [\text{Hemihydrate}]}{\text{Total amount of SO}_3 \text{ in hydraulic composition}}$ |
| Examples | 15 | 0.25 | 2.25 | 90% by mass | 83.9% by mass |
| | 16 | 0.75 | 1.75 | 70% by mass | 83.9% by mass |
| | 17 | 1.00 | 1.50 | 60% by mass | 83.9% by mass |

*in terms of SO₃

In the table, [dihydrate] refers to SO₃ in dihydrate gypsum, and [hemihydrate] refers to SO₃ in hemihydrate gypsum.
The total amount of SO₃ in the hydraulic composition was quantitatively determined by chemical analysis.

From the results of Table 8, the flowability of the mortar was improved and heat of hydration was reduced as the ratio of the amount of hemihydrate gypsum to the total amount of dihydrate gypsum and hemihydrate gypsum was increased.

Examples 18-25

(1) Production of Burned Product B

Limestone and sewage sludge were used as raw materials, the raw materials were compounded in a composition shown in Table 9, and the compounded raw material was burned at 1300° C. by a small rotary kiln to obtain a burned product B.

At this time, in addition to a general heavy oil, a waste oil and a waste plastic were used as a fuel. After the burning, the burned product was ground by a batch type ball mill so that the Blaine specific surface area was 3250 cm²/g.

TABLE 9

| Raw material composition (parts by mass) | | Mineral composition (parts by mass) | | | | |
|---|---|---|---|---|---|---|
| Limestone | Sewage sludge | f-CaO | C₂S | C₂AS | C₄AF | C₃A |
| 100 | 90 | 0.4 | 100 | 33 | 34 | 12 |

(2) Production of Hydraulic Composition

To 100 parts by mass of burned product No. 8 of Table 5 was added a flue gas desulfurization dihydrate gypsum (manufactured by Sumitomo Metal Industries, Ltd.) so that the amount of $SO_3$ was 2 parts by mass, and the resultant mixture was ground at the same time by a batch type ball mill so that the Blaine specific surface area was 3300 cm²/g, whereby a ground product was prepared.

To this ground product, the ground burned product B, a limestone powder (Blaine specific surface area: 4700 cm²/g) and a blast furnace slag powder (Blaine specific surface area: 4400 cm²/g) were mixed in a ratio shown in Table 10 to obtain a hydraulic composition.

For the obtained hydraulic composition, heat of hydration was measured in the same manner as in Examples 1 to 6. The results are also shown in Table 10.

TABLE 10

| | | Hydraulic composition (parts by mass) | | | | | Heat of hydration (J/g) | |
|---|---|---|---|---|---|---|---|---|
| | | Ground burned product A | Gypsum (in terms of $SO_3$) | Ground burned product B | Limestone powder | Blast furnace slag powder | After 7 days | After 28 days |
| Examples | 18 | 100 | 2 | 10 | — | — | 318 | 378 |
| | 19 | 100 | 2 | 20 | — | — | 306 | 365 |
| | 20 | 100 | 2 | 30 | — | — | 294 | 349 |
| | 21 | 100 | 2 | 50 | — | — | 276 | 324 |
| | 22 | 100 | 2 | 100 | — | — | 259 | 302 |
| | 23 | 100 | 2 | 20 | 10 | — | 295 | 351 |
| | 24 | 100 | 2 | 20 | 20 | — | 283 | 330 |
| | 25 | 100 | 2 | 20 | — | 10 | 300 | 361 |
| Comparative Example 3 | | Ordinary Portland cement | | | | | 330 | 381 |

From the results of Table 10, it has been confirmed that heat of hydration is reduced when the ground burned product B is mixed with the ground burned product A.

(3) Production of Mortar

A mortar was prepared using the aforementioned hydraulic composition, a fine aggregate (standard sand defined in JIS R 5201 (method of physical testing of cements)), a water reducing agent (polycarboxylic acid based air entraining and high range water reducing agent (Leobuild SP8N manufactured by NMB Co., Ltd.)) or a water reducing agent B (naphthalene-sulfonic acid based high water reducing agent (Mighty 150 manufactured by Kao Corporation)) and water (tap water), and the flow value was evaluated in the same manner as in Examples 1 to 6. The results are shown in Table 11.

The compressive strength was measured in the same manner as in Examples 1 to 6. The results are shown in Table 12.

In any case, as Comparative Example 3, evaluations when using an ordinary Portland cement were made.

TABLE 11

| | | Hydraulic composition (parts by mass) | | | | Flow value (mm) | |
|---|---|---|---|---|---|---|---|
| | | Ground burned product A | Gypsum (in terms of SO$_3$) | Ground burned product B | Limestone powder | Blast furnace slag powder | Water reducing agent A | Water reducing agent B |
| Examples | 18 | 100 | 2 | 10 | — | — | 202 | 244 |
| | 19 | 100 | 2 | 20 | — | — | 212 | 262 |
| | 20 | 100 | 2 | 30 | — | — | 226 | 277 |
| | 21 | 100 | 2 | 50 | — | — | 246 | 305 |
| | 22 | 100 | 2 | 100 | — | — | 285 | 340 |
| | 23 | 100 | 2 | 20 | 10 | — | 225 | 274 |
| | 24 | 100 | 2 | 20 | 20 | — | 287 | 352 |
| | 25 | 100 | 2 | 20 | — | 10 | 220 | 269 |
| Comparative Example 3 | | Ordinary Portland cement | | | | | 259 | 257 |

From the results of Table 11, it has been confirmed that the flowability is improved when the ground burned product B is mixed with the ground burned product A.

TABLE 12

| | | Hydraulic composition (parts by mass) | | | | | Compressive strength (N/mm$^2$) | | |
|---|---|---|---|---|---|---|---|---|---|
| | | Ground burned product A | Gypsum (in terms of SO$_3$) | Ground burned product B | Limestone powder | Blast furnace slag powder | After 3 days | After 7 days | After 28 days |
| Examples | 19 | 100 | 2 | 20 | — | — | 29.5 | 44.2 | 63.9 |
| | 20 | 100 | 2 | 30 | — | — | 28.0 | 43.1 | 63.0 |
| | 21 | 100 | 2 | 50 | — | — | 25.8 | 41.1 | 62.7 |
| | 22 | 100 | 2 | 100 | — | — | 19.5 | 35.8 | 60.2 |
| | 23 | 100 | 2 | 20 | 10 | — | 29.9 | 45.3 | 63.5 |
| | 24 | 100 | 2 | 20 | 20 | — | 27.0 | 42.9 | 63.7 |
| | 25 | 100 | 2 | 20 | — | 10 | 27.9 | 43.0 | 64.0 |
| Comparative Example 3 | | Ordinary Portland cement | | | | | 29.2 | 42.4 | 60.5 |

Examples 26-28

(1) Production of Hydraulic Composition

To 100 parts by mass of burned product No. 8 of Table 5, 30 parts by mass of burned product B, a flue gas desulfurization dihydrate gypsum (manufactured by Sumitomo Metal Industries, Ltd.) and a hemihydrate gypsum obtained by heating the flue gas desulfurization dihydrate gypsum at 140° C. are mixed in amounts shown in Table 13, and ground at the same time by a batch type ball mill so that the Blaine specific surface area was 3250±50 cm$^2$/g, whereby a hydraulic composition was obtained.

TABLE 13

| | | Amount of gypsum added* (parts by mass) | | $\dfrac{\text{[Hemihydrate]}}{\text{[Dihydrate] + [Hemihydrate]}}$ | $\dfrac{\text{[Dihydrate] + [Hemihydrate]}}{\text{Total amount of SO}_3\text{ in hydraulic composition}}$ |
|---|---|---|---|---|---|
| | | Dihydrate gypsum | Hemihydrate gypsum | | |
| Examples | 26 | 0.25 | 2.25 | 90% by mass | 83.9% by mass |
| | 27 | 0.75 | 1.75 | 70% by mass | 83.9% by mass |
| | 28 | 1.00 | 1.50 | 60% by mass | 83.9% by mass |

*in terms of SiO$_3$
In the table, [dihydrate] refers to SO$_3$ in dihydrate gypsum, and [hemihydrate] refers to SO$_3$ in hemihydrate gypsum.
The total amount of SO$_3$ in the hydraulic composition was quantitatively determined by chemical analysis.

(2) Production of Mortar

A mortar was prepared using the aforementioned hydraulic composition, a fine aggregate (standard sand defined in JIS R 5201 (method of physical testing of cements)), a water reducing agent (polycarboxylic acid based air entraining and high range water reducing agent (Leobuild SP8N manufactured by NMB Co., Ltd.)) and water (tap water), and the flow value and the compressive strength were evaluated in the same manner as in Examples 1 to 6. The results are shown in Table 14.

TABLE 14

|  |  | Flow value (mm) | Compressive strength (N/mm$^2$) | | |
|---|---|---|---|---|---|
|  |  |  | After 3 days | After 7 days | After 28 days |
| Examples | 26 | 286 | 29.0 | 44.5 | 63.5 |
|  | 27 | 271 | 28.6 | 44.3 | 63.2 |
|  | 28 | 248 | 28.7 | 44.0 | 63.0 |

From the results of Table 14, the flowability of the mortar was improved as the ratio of the amount of hemihydrate gypsum to the total amount of dihydrate gypsum and hemihydrate gypsum was increased.

The invention claimed is:

1. A hydraulic composition comprising:
a ground burned product A having a hydraulic modulus of 1.8 to 2.3, a silica modulus of 1.3 to 2.3 and an iron modulus of 1.3 to 2.8; fluorine; and gypsum; wherein said fluorine is present in an amount of no more than 0.4 wt %.

2. The hydraulic composition according to claim 1, wherein the gypsum comprises dihydrate gypsum and hemihydrate gypsum, and the ratio of the amount of SO$_3$ in the dihydrate gypsum and the hemihydrate gypsum to the total amount of SO$_3$ in said hydraulic composition is 40% by mass or more.

3. The hydraulic composition according to claim 1, wherein the gypsum comprises dihydrate gypsum and hemihydrate gypsum, and the ratio of the amount of the hemihydrate gypsum to the total amount of the dihydrate gypsum and hemihydrate gypsum is 30% by mass or more in terms of SO$_3$.

4. The hydraulic composition according to claim 1, further comprising one or more inorganic powders selected from the group consisting of a blast furnace slag powder, a fly ash, a limestone powder, a silica stone powder and a silica fume.

5. The hydraulic composition according to claim 1, further comprising a ground burned product B comprising 10 to 2000 parts by mass of 2CaO.Al$_2$O$_3$.SiO$_2$ based on 100 parts by mass of 2CaO.SiO$_2$ and having a content of 3CaO.Al$_2$O$_3$ of 20 parts by mass or less.

6. The hydraulic composition according to claim 1, wherein the burned product A is produced using, as a raw material, one or more selected from the group consisting of industrial wastes, non-industrial wastes and soil generated by construction.

7. The hydraulic composition according to claim 5, wherein the burned product B is produced using as a raw materials one or more selected from the group consisting of industrial wastes, non-industrial wastes and soil generated by construction.

8. A burned product having a hydraulic modulus of 1.8 to 2.3, a silica modulus of 1.3 to 2.3 and an iron modulus of 1.3 to 2.8.

* * * * *